(12) United States Patent
Lee

(10) Patent No.: US 9,753,612 B2
(45) Date of Patent: Sep. 5, 2017

(54) ELECTRONIC DEVICE FOR MANAGING APPLICATIONS RUNNING THEREIN AND METHOD FOR SAME

(71) Applicant: Chiun Mai Communication Systems, Inc., New Taipei (TW)

(72) Inventor: Ke-Han Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 254 days.

(21) Appl. No.: 14/619,238

(22) Filed: Feb. 11, 2015

(65) Prior Publication Data

US 2015/0227287 A1  Aug. 13, 2015

(30) Foreign Application Priority Data

Feb. 12, 2014 (CN) .......................... 2014 1 0047994

(51) Int. Cl.
   *G06F 3/00*       (2006.01)
   *G06F 3/0482*     (2013.01)
   *G06F 3/0488*     (2013.01)

(52) U.S. Cl.
   CPC ........ *G06F 3/0482* (2013.01); *G06F 3/04883* (2013.01)

(58) Field of Classification Search
   CPC combination set(s) only.
   See application file for complete search history.

(56) References Cited

U.S. PATENT DOCUMENTS

| | | | |
|---|---|---|---|
| 2012/0289290 A1* | 11/2012 | Chae ..................... | G06F 3/0488 455/566 |
| 2013/0167078 A1* | 6/2013 | Monnig ................ | G06F 3/0484 715/800 |
| 2013/0174179 A1* | 7/2013 | Park ...................... | G06F 9/4843 718/107 |
| 2013/0187861 A1* | 7/2013 | Lavallee ................ | G06F 9/543 345/173 |
| 2013/0205304 A1* | 8/2013 | Jeon ...................... | G06F 9/4843 718/107 |
| 2013/0222321 A1* | 8/2013 | Buening ................ | G06F 3/041 345/173 |
| 2013/0227419 A1* | 8/2013 | Lee ......................... | G06F 9/48 715/728 |
| 2013/0263042 A1* | 10/2013 | Buening ............... | G06F 3/0488 715/783 |

(Continued)

FOREIGN PATENT DOCUMENTS

TW  201014327 A1  4/2010
TW  201229876 A1  7/2012

(Continued)

*Primary Examiner* — Hien Duong
(74) *Attorney, Agent, or Firm* — Steven Reiss

(57) ABSTRACT

A method for managing a number of applications running in an electronic device includes determining a touch gesture of a number of touch gestures on a display of the electronic device, opening an interface on a display of the electronic device to display icons of all applications that are currently running in the background when one of the touch gestures is determined, and managing the applications currently running in the background according to the number of touch gestures. The touch gestures include a single touch gesture, a normal slide gesture, and a pressure slide gesture.

15 Claims, 9 Drawing Sheets

(56) References Cited

U.S. PATENT DOCUMENTS

| | | | | |
|---|---|---|---|---|
| 2013/0346912 A1* | 12/2013 | Buening | ............... | G06F 3/0488 715/783 |
| 2014/0089831 A1* | 3/2014 | Kim | ..................... | G06F 3/0481 715/769 |
| 2014/0089832 A1* | 3/2014 | Kim | ..................... | G06F 3/0481 715/769 |
| 2016/0188181 A1* | 6/2016 | Smith | ..................... | G06F 3/048 715/765 |

FOREIGN PATENT DOCUMENTS

| | | | |
|---|---|---|---|
| TW | 201246023 A1 | 11/2012 | |
| TW | 201403406 A | 1/2014 | |

\* cited by examiner

ELECTRONIC DEVICE FOR MANAGING APPLICATIONS RUNNING THEREIN AND METHOD FOR SAME

FIELD

The present disclosure relates to methods for managing a plurality of applications running in the background of an electronic device.

BACKGROUND

Generally, when switching between applications of an electronic device, the applications that are running in the background are viewed one at a time and arranged according to how recently the applications were set to run in the background.

BRIEF DESCRIPTION OF THE DRAWINGS

Implementations of the present technology will now be described, by way of example only, with reference to the attached figures.

DETAILED DESCRIPTION

Figure 1:
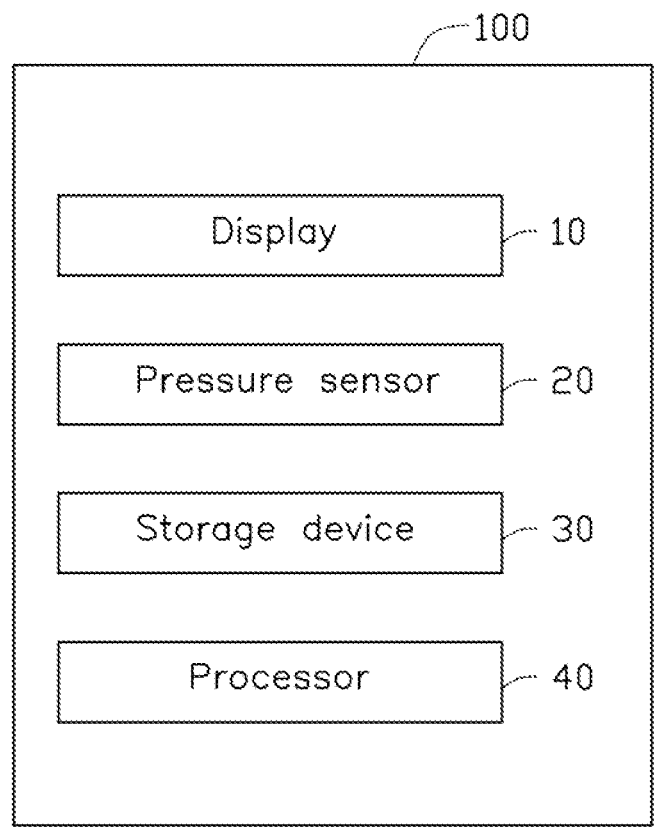
FIG. 1 is a block diagram of an exemplary embodiment of an electronic device for managing a plurality of applications running therein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an exemplary embodiment of an electronic device 100 for managing a plurality of applications running therein. The electronic device 100 can include a display 10, a pressure sensor 20, a storage device 30, and a processor 40. The display 10 can receive a plurality of touch gestures applied by an input tool thereon. The pressure sensor 20 can detect pressure values of the touch gestures applied on the display 10 by the input tool.

Figure 2:
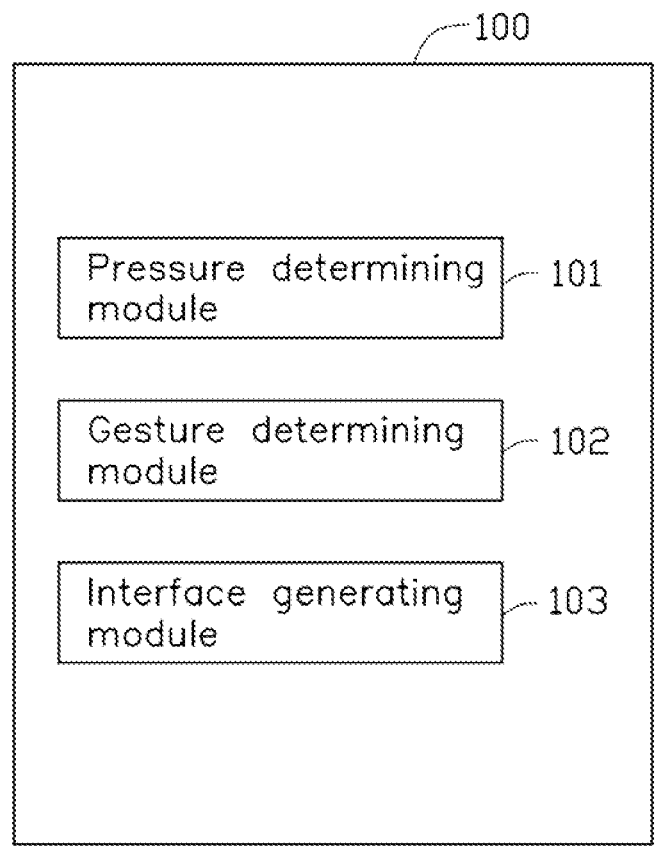
FIG. 2 is a block diagram of an exemplary embodiment of function modules of the electronic device.

FIG. 2 illustrates an exemplary embodiment of a plurality of function modules of the electronic device 100. The plurality of function modules can include a pressure determining module 101, a gesture determining module 102, and an interface generating module 103. The modules 101-103 can include one or more software programs in the form of computerized codes stored in the storage device 30. The computerized codes can include instructions executed by the processor 40 to provide functions for the modules 101-103.

The pressure determining module 101 can determine whether a pressure value of the touch gestures on the display is greater than a threshold pressure value. The plurality of touch gestures can include a single touch gesture, a normal slide gesture, and a pressure slide gesture. The single touch gesture can be the input tool applying a pressure to a single point on the display with a pressure value of the single touch gesture being lower than the threshold pressure value. The normal slide gesture can be the input tool being dragged along the display with a pressure value of dragging the input tool being less than the threshold pressure value. The pressure slide gesture can be the input tool being dragged along the display with a pressure value of dragging the input tool being greater than the threshold pressure value.

The gesture determining module 102 can determine a touch gesture of the plurality of touch gestures applied by the input tool on the display according to the pressure value of the touch gesture determined by the pressure determining module 101.

The interface generating module 103 can display a plurality of interfaces on the display according to the touch gestures determined by the gesture determining module 102. The plurality of interfaces can be operable by the input tool.

Figure 3:
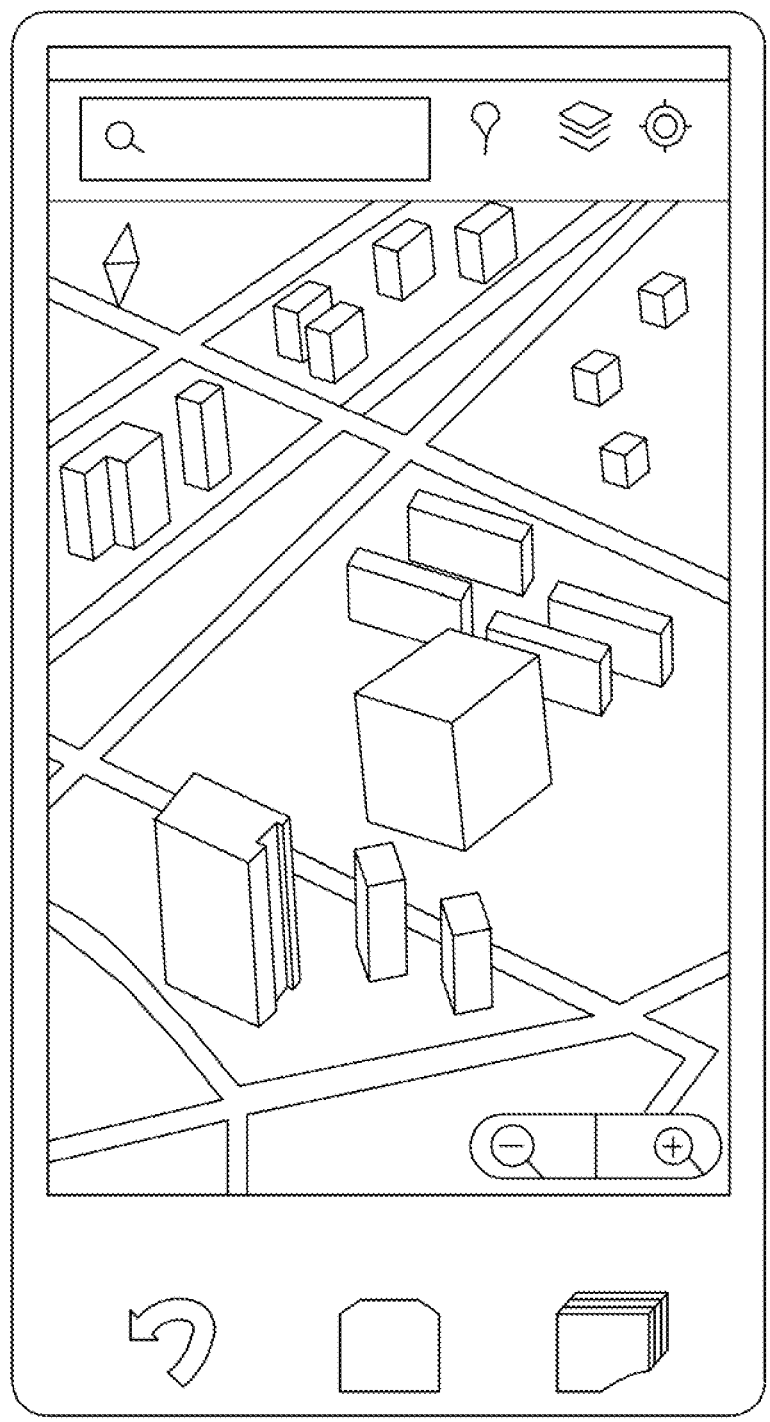
FIG. 3 is a diagrammatic view of an exemplary embodiment of an interface of an application currently in use displayed on a display of the electronic device.

Referring to FIG. 3, an interface of an application currently in use is displayed on the display. The pressure slide gesture can be applied from a first portion of the display to a second portion of the display. In at least one embodiment, the first portion of the display is a left or right edge portion of the display, and the second portion is an interior portion of the display. When the gesture determining module determines that the pressure slide gesture is applied from the first portion of the display to the second portion of the display, the interface generating module can generate and display a split-screen interface on the display (shown in FIG. 4).

Figure 4:
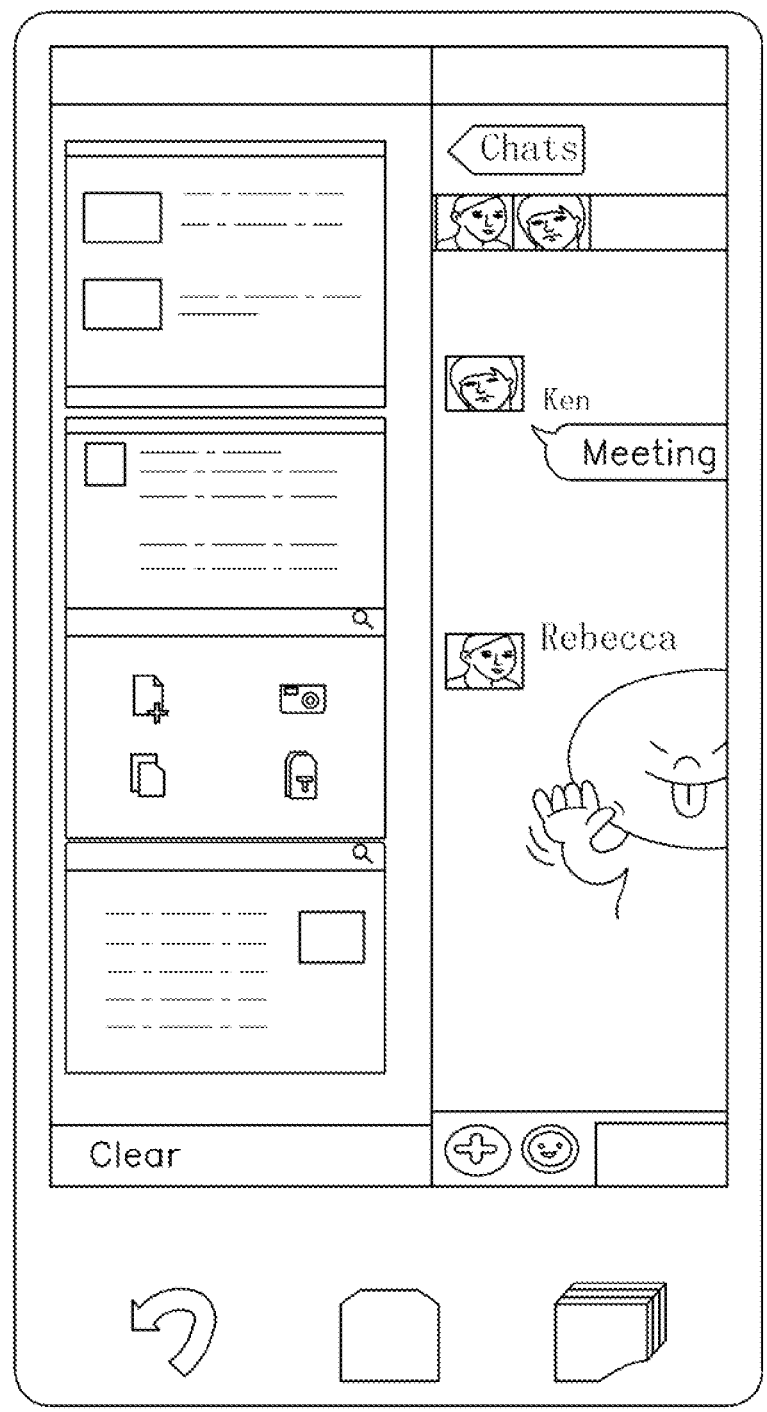
FIG. 4 is a diagrammatic view of an exemplary embodiment of a split-screen interface displaying icons of a plurality of applications running in the background.

Referring to FIG. 4, the split-screen interface can have two sides and display a plurality of icons. A first side of the split-screen interface can include an icon of an application most recently run in the background. A second side of the split-screen interface can include the icons of the rest of the applications currently running in the background. The split-screen interface can remain displayed on the display while the input tool maintains the pressure value on the display greater than the threshold pressure value.

Figure 5:
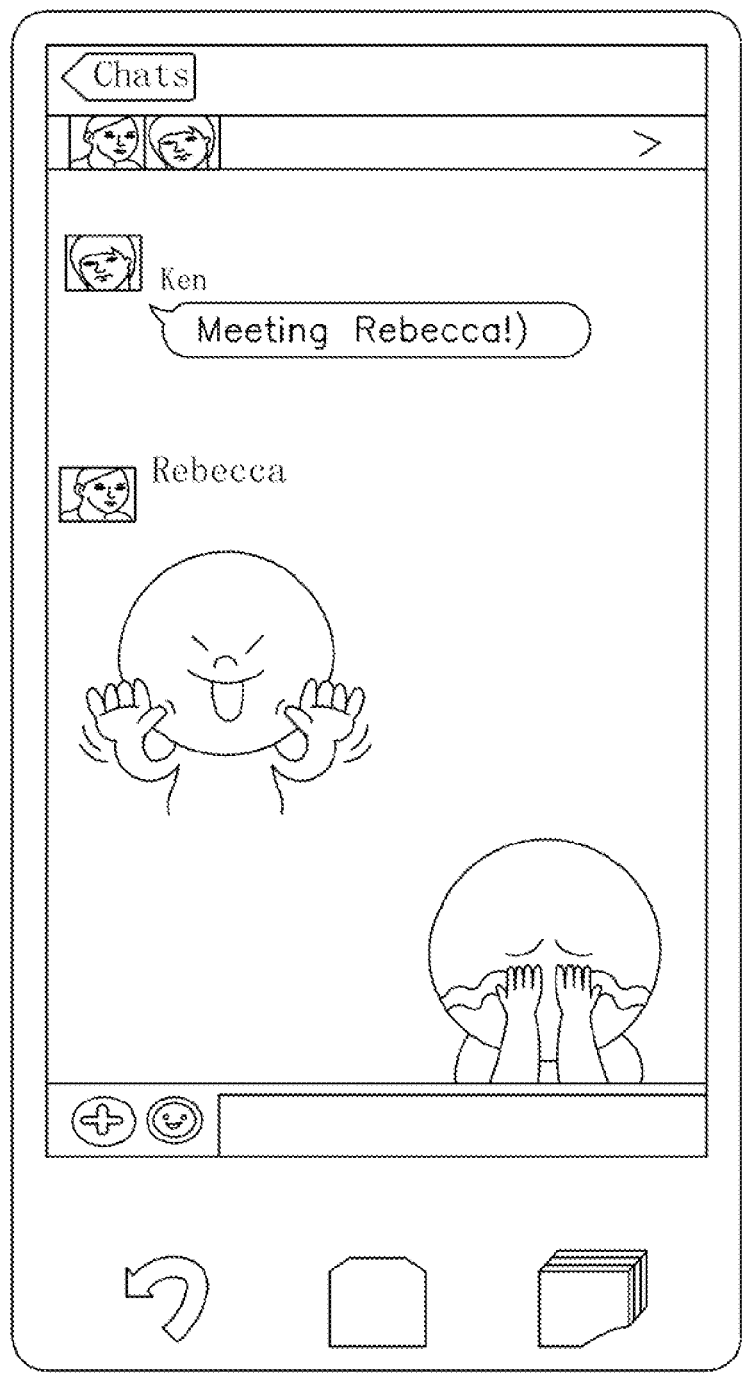
FIG. 5 is a diagrammatic view of an exemplary embodiment of an interface of an application most recently running in the background displayed on the display of the electronic device.

When the input tool is removed from the display, an interface of the application corresponding to the icon on the first side of the split-screen can be fully displayed on the display (shown in FIG. 5). When the pressure slide gesture is applied on the display from the second portion of the display to a third portion of the display, the interface of the application corresponding to the icon on the first side of the split-screen can be displayed on the display side-by-side with the interface of the application currently in use (shown in FIG. 6). In at least one embodiment, the third portion of the display can be a top portion of the display.

When the normal slide gesture is applied on the display from the second portion of the display to the third portion of the display, the split-screen interface can remain displayed on the display to allow the plurality of icons on the second side of the split-screen interface to be browsed by the input tool. When the split-screen interface remains displayed on the display, when the normal slide gesture is applied from a point of the display corresponding to the second side of the split-screen interface to either the third portion of the display or a fourth portion of the display, the icons on the second side of the split-screen interface can be scrolled in a corresponding direction to display more icons of the other applications running in the background. In at least one embodiment, the fourth portion of the display can be a bottom portion of the display.

When the plurality of icons on the second side of the split-screen interface can be browsed by the input tool, an interface of one of the other applications running in the background can be fully displayed on the display by applying the single touch gesture on a point of the display corresponding to the icon of the other application (not shown). When the pressure slide gesture is applied on the display from a point of the display corresponding to one of the icons on the second side of the split-screen interface to the third portion of the display, an interface of the application of the corresponding icon can be displayed on the display side-by-side with the interface of the application currently in use (shown in FIG. 7)

Referring to FIG. 5, the interface of the application corresponding to the icon on the first side of the display can be fully displayed on the display when the input tool is removed from the display.

Figure 6:
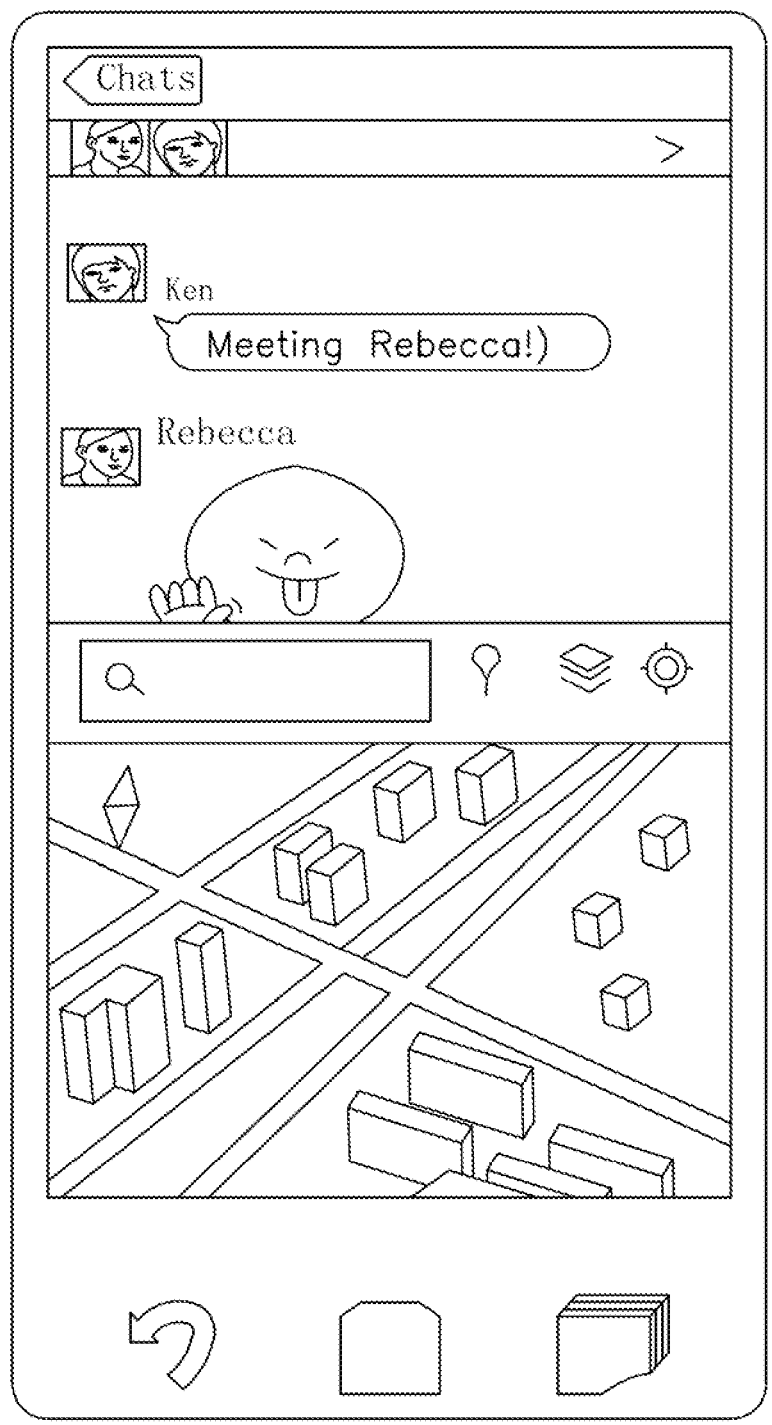
FIG. 6 is a diagrammatic view of an exemplary embodiment of the interface of the application most recently running in the background displayed on the display side-by-side with the interface of the application currently in use.

Referring to FIG. 6, when the pressure slide gesture is applied from the second portion of the display to the third portion of the display, the interface of the application corresponding to the icon on the first side of the display can be displayed on the display side-by-side with the interface of the application currently in use.

Figure 7:
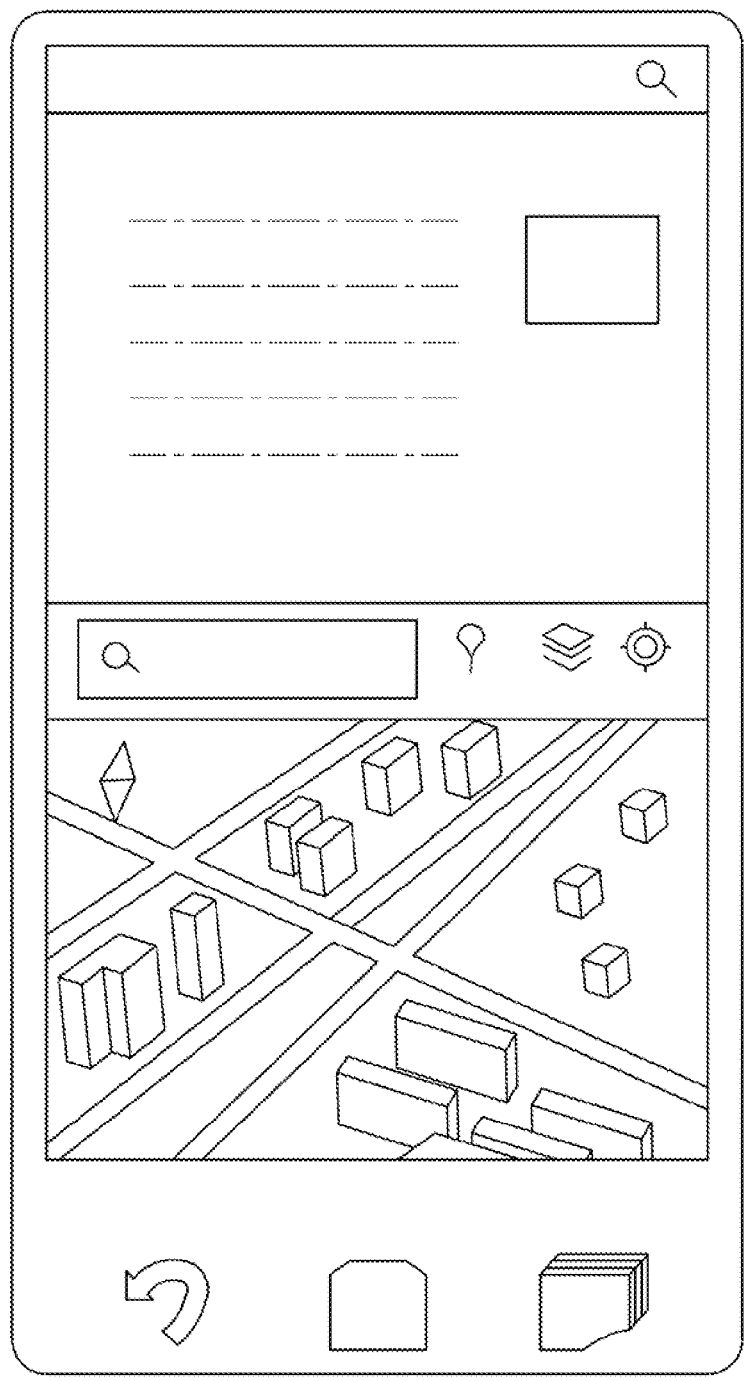
FIG. 7 is similar to FIG. 6, but shows an interface of another application running in the background displayed on the display side-by-side with the interface of the application currently in use.

Referring to FIG. 7, when the icons on the second side of the split-screen interface can be browsed, and the pressure slide gesture is applied from a point of the display corresponding to one of the icons on the second side of the split-screen interface to the third portion of the display, the interface of the application corresponding to the icon can be displayed on the display side-by-side with the interface of the application currently in use.

Figure 8:
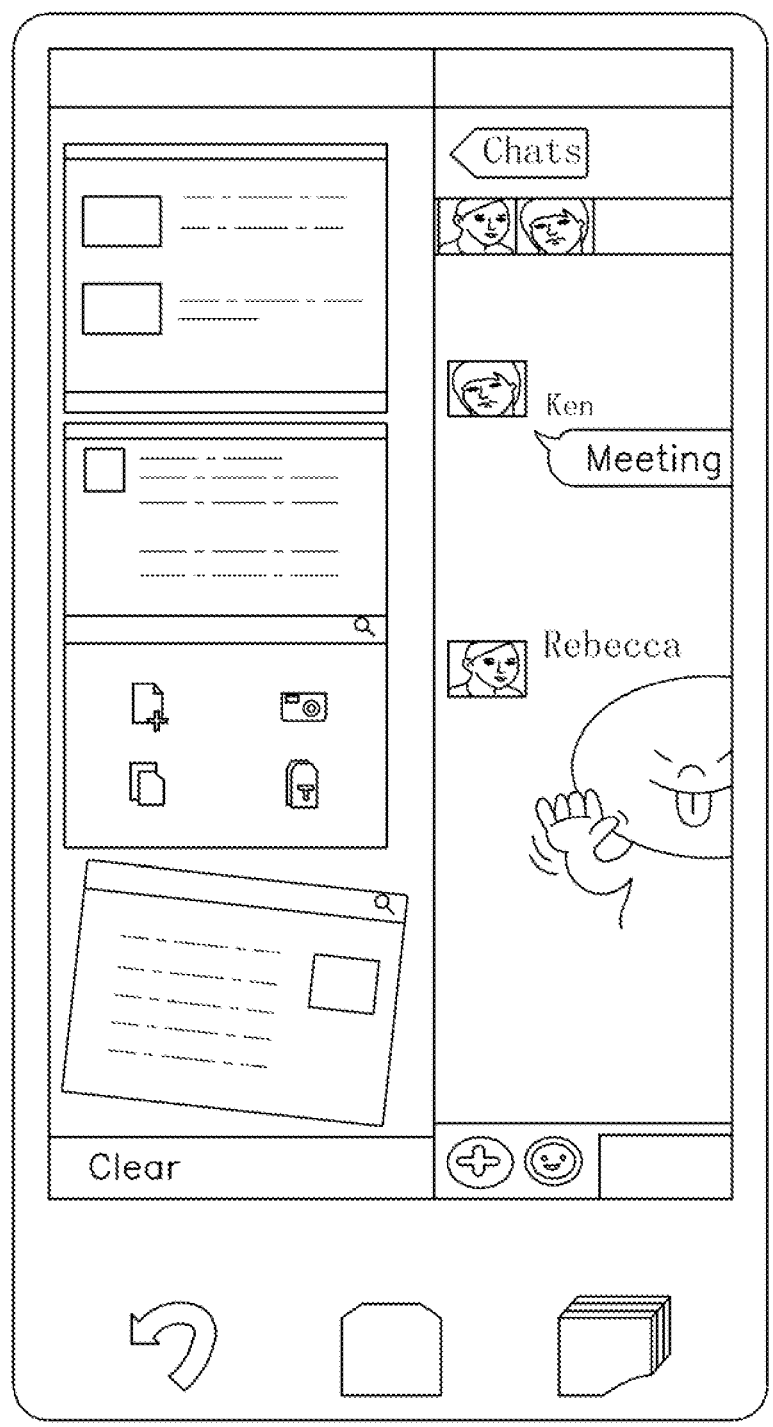
FIG. 8 is a diagrammatic view of an exemplary embodiment of a method for removing the icon of one of the applications from the split-screen interface.

Referring to FIG. 8, when the second side of the split-screen interface can be browsed, and the pressure slide gesture is applied from a point of the display corresponding to one of the icons of the split-screen interface to the fourth portion of the display, the icon can be removed from the second side of the split-screen interface, and the corresponding application can be turned off. When the icon on the first side of the display is removed, the icon of a next application most recently run in the background can be moved to the first side of the split-screen interface.

Figure 9:
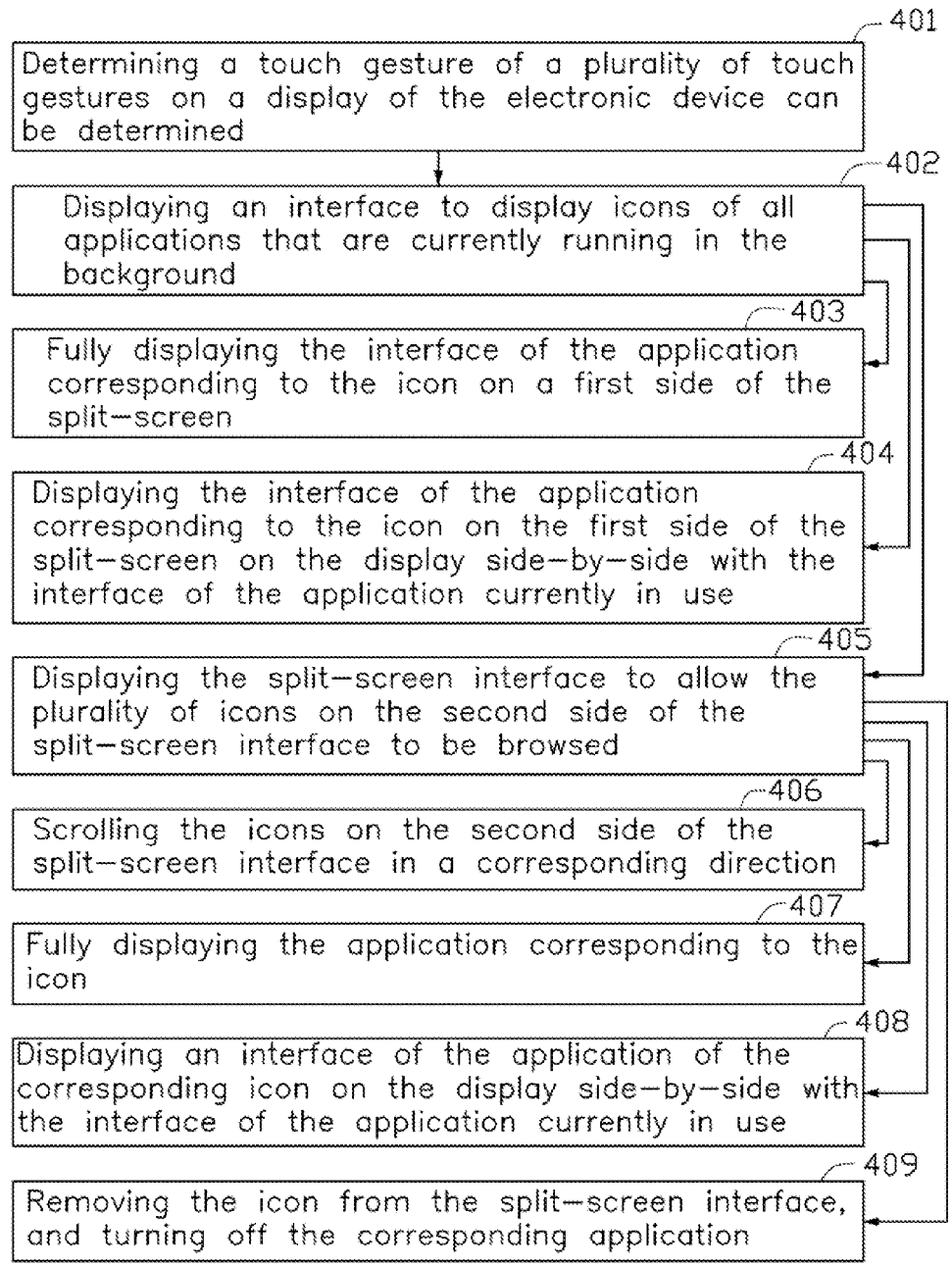
FIG. 9 is a flowchart diagram of an exemplary embodiment of method for managing a plurality of applications running in the background of an electronic device.

FIG. 9 illustrates a flowchart of an exemplary method for managing a plurality of applications running in an electronic device. The example method is provided by way of example, as there are a variety of ways to carry out the method. The method described below can be carried out using the configurations illustrated in FIGS. 1-9, for example, and various elements of these figures are referenced in explaining the example method. Each block shown in FIG. 9 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 401.

At block 401, a touch gesture of a plurality of touch gestures on a display of the electronic device can be determined. The plurality of touch gestures can include a single touch gesture, a normal slide gesture, and a pressure slide gesture. When the pressure slide gesture is applied from a first portion of the display to a second portion of the display, block 402 can be implemented. Otherwise, when the pressure slide gesture is not applied from the first portion of the display to the second portion of the display, block 401 can be implemented.

At block 402, an interface to display icons of all applications that are currently running in the background can be displayed on the display of the electronic device. The interface can be a split-screen interface having two sides. A first side of the split-screen interface can include an icon of an application most recently run in the background. A second side of the split-screen interface can include the icons of the rest of the applications currently running in the background. The split-screen interface can remain displayed on the display while the input tool maintains the pressure value on the display greater than the threshold pressure value.

When the input tool is removed from the display, block 403 can be implemented. When the pressure slide gesture is applied on the display from the second portion of the display to a third portion of the display, block 404 can be implemented. When the normal slide gesture is applied on the display from the second portion of the display to the third portion of the display, block 405 can be implemented.

At block 403, the interface of the application corresponding to the icon on the first side of the split-screen can be fully displayed on the display.

At block 404, the interface of the application corresponding to the icon on the first side of the split-screen can be displayed on the display side-by-side with the interface of the application currently in use.

At block 405, the split-screen interface can remain displayed on the display to allow the plurality of icons on the second side of the split-screen interface to be browsed. When the normal slide gesture is applied from a point of the display corresponding to the second side of the split-screen interface to either the third portion of the display or a fourth portion of the display, block 406 can be implemented. When the single touch gesture is applied to one of the icons on the second side of the split-screen interface, block 407 can be implemented. When the pressure slide gesture is applied on the display from a point of the display corresponding to one of the icons on the second side of the split-screen interface to the third portion of the display, block 408 can be implemented. When the pressure slide gesture is applied from a point of the display corresponding to one of the icons of the split-screen interface to a fourth portion of the display, block 409 can be implemented.

At block 406, the icons on the second side of the split-screen interface can be scrolled in a corresponding direction to display more icons of the other applications running in the background.

At block 407, the application corresponding to the icon can be fully displayed on the display.

At block 408, an interface of the application of the corresponding icon can be displayed on the display side-by-side with the interface of the application currently in use.

At block 409, the icon can be removed from the split-screen interface, and the corresponding application can be turned off. When the icon on the first side of the display is removed, the icon of a next application most recently run in the background can be moved to the first side of the split-screen interface.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for managing a plurality of applications running in an electronic device, the method comprising:
    determining a touch gesture from a plurality of touch gestures on a display of the electronic device;
    opening an interface on a display of the electronic device to display icons of all applications that are currently running in the background, when the touch gesture from the plurality of touch gestures is determined; and
    managing the applications currently running in the background according to the plurality of touch gestures, the plurality of touch gestures applied by an input tool and comprising:
        a single touch gesture that represents applying a pressure by the input tool to a single point on the display, a pressure value of the single touch gesture being lower than a threshold pressure value;
        a normal slide gesture that represents dragging the input tool along the display, a pressure value of dragging the input tool being less than the threshold pressure value; and
        a pressure slide gesture that represents dragging the input tool along the display, and a pressure value of dragging the input tool being greater than the threshold pressure value;
    wherein: the interface to display the icons of all applications currently running in the background is displayed in response to the pressure slide gesture of the input tool applied from a first portion of the display to a second portion of the display; the interface to display the icons is a split-screen interface having two sides; an icon of an application most recently run in the background is displayed on a first side of the split-screen interface; and icons of the rest of the applications currently running in the background are displayed on a second side of the split-screen interface;
    and after the split-screen interface is displayed:
    when the input tool is removed from the display, and an interface of the application most recently run in the background is opened and fully displayed on the display;
    when the pressure slide gesture of the input tool is applied from the second portion of the display to a third portion of the display while the pressure value of the input tool on the display is maintained to be greater than the threshold pressure value, an interface of the application most recently run in the background is opened and displayed on the display side-by-side with an application currently in use; and
    when the normal slide gesture of the input tool is applied from the second portion of the display to the third portion of the display, the split screen interface remains displayed, and the icons of the second side of the split-screen interface are able to be browsed by the input tool.

2. The method as in claim 1, wherein the split-screen interface remains displayed while the input tool maintains a pressure value on the display greater than the threshold pressure value.

3. The method as in claim 1, wherein when the icons of the second side of the split-screen interface are able to be browsed by the input tool:
    when the single touch gesture is applied to a point of the display corresponding to one of the icons of the second side of the split-screen interface, an interface of the application of the corresponding icon is opened and fully displayed on the display;
    when the pressure slide gesture is applied from a point of the display corresponding to one of the icons of the second side of the split-screen interface to the third portion of the display, an interface of the application of the corresponding icon is opened and displayed on the display side-by-side with the application currently in use;
    when the normal slide gesture is applied from a point of the display corresponding to the second side of the split-screen interface to either the third portion of the display or a fourth portion of the display, the second side of the split-screen display is scrolled in a corresponding direction to display more icons of applications that are currently run in the background; and
    when the pressure slide gesture is applied from a point of the display corresponding to any one of the icons of the first side or the second side of the split-screen interface to a fourth portion of the display, the application of the corresponding icon is turned off to not run in the background, and the corresponding icon is removed from the split-screen interface.

4. The method as in claim 3, wherein when the icon of the application most recently run in the background is removed from the first side of the split-screen interface, the icon corresponding to the next application most recently run in the background is moved to the first side of the split-screen interface.

5. The method as in claim 3, wherein the fourth portion of the display is a bottom portion of the display.

6. The method as in claim 1, wherein the third portion of the display is a top portion of the display.

7. The method as in claim 1, wherein the first portion of the display is a right or left edge portion of the display, and the second portion of the display is an interior portion of the display.

8. The method as in claim 1, wherein the input tool is a finger of a user of the electronic device.

9. An electronic device for managing a plurality of applications run therein, the electronic device comprising:
a display configured to receive touch gestures applied by an input tool thereon;
a pressure sensor configured to detect pressure values of the touch gestures applied on the display by the input tool;
a storage device configured to store a plurality of instructions of a plurality of modules; and
a processor configured to execute the instructions of the plurality of modules, the plurality of modules comprising:
a pressure determining module configured to determine whether a pressure value of the touch gestures is greater than a threshold pressure value;
a gesture determining module configured to determine a touch gesture of a plurality of touch gestures applied by the input tool; and
an interface generating module configured to display a plurality of interfaces on the display according to the determined touch gestures, the plurality of interfaces operable by the input tool;
wherein the plurality of touch gestures comprises:
a single touch gesture that represents applying a pressure by the input tool to a single point on the display, a pressure value of the single touch gesture being lower than a threshold pressure value;
a normal slide gesture that represents dragging the input tool along the display, a pressure value of dragging the input tool being less than the threshold pressure value; and
a pressure slide gesture that represents dragging the input tool along the display, and a pressure value of dragging the input tool being greater than the threshold pressure value;
wherein the interface generating module generates and displays an interface to display icons of all applications currently running in the background in response to the pressure slide gesture of the input tool applied from a first portion of the display to a second portion of the display;
the interface to display the icons is a split-screen interface having two sides;
an icon of an application most recently run in the background is displayed on a first side of the split-screen interface; and
icons of the rest of the applications currently running in the background are displayed on a second side of the split-screen interface;
and after the split-screen interface is displayed:
when the input tool is removed from the display, an interface of the application most recently run in the background is opened and fully displayed on the display;

when the pressure slide gesture of the input tool is applied from the second portion of the display to a third portion of the display as the pressure value of the input tool on the display is maintained to be greater than the threshold pressure value, an interface of the application most recently run in the background is opened and displayed on the display side-by-side with an application currently in use; and when the normal slide gesture of the input tool is applied from the second portion of the display to the third portion of the display, the split-screen interface remains displayed, and the icons of the second side of the split-screen interface are able to be browsed by the input tool.

10. The electronic device as in claim 9, wherein the split-screen interface remains displayed while the input tool maintains a pressure value on the display greater than the threshold pressure value.

11. The electronic device as in claim 9, wherein when the icons of the second side of the split-screen interface are able to be browsed by the input tool:
when the single touch gesture is applied to a point of the display corresponding to one of the icons of the second side of the split-screen interface, an interface of the application of the corresponding icon is opened and fully displayed on the display;
when the pressure slide gesture is applied from a point of the display corresponding to one of the icons of the second side of the split-screen interface to the third portion of the display, an interface of the application of the corresponding icon is opened and displayed on the display side-by-side with the application currently in use;
when the normal slide gesture is applied from a point of the display corresponding to the second side of the split-screen interface to either the third portion of the display or a fourth portion of the display, the second side of the split-screen display is scrolled in a corresponding direction to display more icons of applications that are currently being run in the background; and
when the pressure slide gesture is applied from a point of the display corresponding to any one of the icons of the first side or the second side of the split-screen interface to a fourth portion of the display, the application of the corresponding icon is turned off to not run in the background, and the corresponding icon is removed from the split-screen interface.

12. The electronic device as in claim 11, wherein the fourth portion of the display is a bottom portion of the display.

13. The electronic device as in claim 9, wherein when the icon of the application most recently run in the background is removed from the first side of the split-screen interface, the icon corresponding to the next application most recently run in the background is moved to the first side of the split-screen interface.

14. The electronic device as in claim 9, wherein the third portion of the display is a top portion of the display.

15. The electronic device as in claim 9, wherein the first portion of the display is a right or left edge portion of the display, and the second portion of the display is an interior portion of the display.

* * * * *